United States Patent [19]

Mahan

[11] Patent Number: 4,649,664

[45] Date of Patent: Mar. 17, 1987

[54] APPARATUS FOR SECURING A FISHING LURE TO A FISHING LINE

[76] Inventor: Joe C. Mahan, 202 Mistletoe Dr., Richardson, Tex. 75081

[21] Appl. No.: 781,056

[22] Filed: Sep. 27, 1985

[51] Int. Cl.⁴ .............................................. A01K 91/04
[52] U.S. Cl. .................... 43/44.83; 43/42.49; 24/130
[58] Field of Search .................. 43/43.1, 43.11, 43/42.49, 44.83, 44.91, 44.94; 114/218; 24/117 R, 121, 129 R, 130, 134 L, 140

[56] References Cited

U.S. PATENT DOCUMENTS

| | | |
|---|---|---|
| 484,254 | 10/1892 | Settle . |
| 670,328 | 3/1901 | Rigby ................................. 43/43.1 |
| 757,820 | 4/1904 | Lykke ................................. 24/130 |
| 835,656 | 11/1906 | Amann ................................ 24/121 |
| 1,193,912 | 8/1916 | Maire . |
| 2,077,184 | 3/1937 | Rader . |
| 2,136,014 | 11/1938 | McDonald ......................... 24/130 |
| 2,269,615 | 1/1942 | Walker . |
| 2,459,287 | 1/1949 | Robbins . |
| 3,418,733 | 12/1968 | Tyrrell ............................. 24/117 R |
| 3,675,276 | 7/1972 | Nuse .................................. 24/130 |
| 3,939,594 | 2/1976 | Wagner ............................ 43/42.49 |
| 4,117,574 | 10/1978 | Yoshida . |
| 4,145,833 | 3/1979 | Ratte . |
| 4,361,938 | 12/1982 | Emery ............................... 114/218 |
| 4,373,463 | 2/1983 | Beaudette ........................ 114/218 |
| 4,459,775 | 7/1984 | Ratte . |
| 4,461,059 | 7/1984 | Bury . |

FOREIGN PATENT DOCUMENTS 26071 of 1905 United Kingdom ................ 24/130

OTHER PUBLICATIONS

Two pictures of "The Gripper", Golden Eye Products, P.O. Box 35267, Minneapolis, MN 55434.

*Primary Examiner*—Nicholas P. Godici
*Assistant Examiner*—G. M. Reid
*Attorney, Agent, or Firm*—Kanz, Scherback & Timmons

[57] ABSTRACT

An apparatus for releaseably securing a fishing lure to a fishing line. The apparatus includes an elongate body having spaced pairs of aligned transverse gripping members. The apparatus is secured by the fishing line to the fishing lure or alternatively forms an integral part of the lure. A fishing line is inserted through passageways in opposite ends of the body of the apparatus and forms a loop that engages the "eye" of the fishing lure, secured by engaging gripping members on alternate sides of sequential pairs on the apparatus.

10 Claims, 11 Drawing Figures

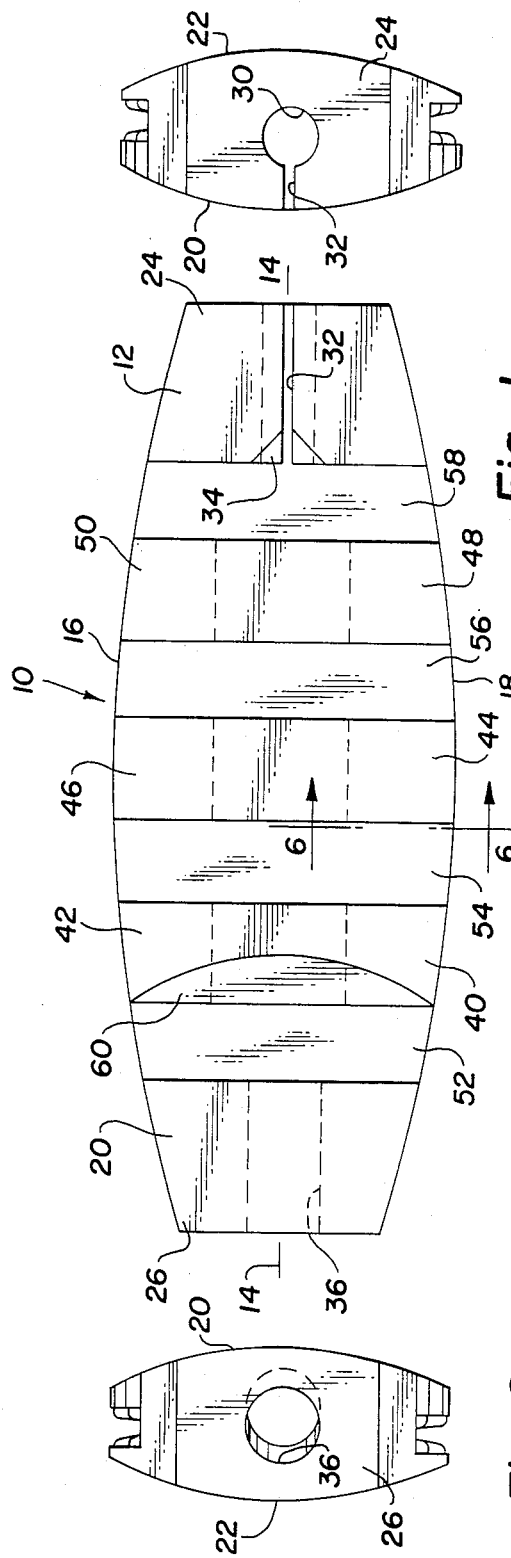
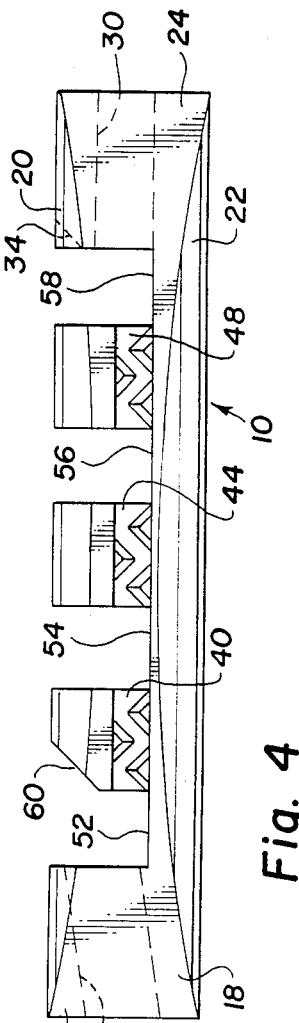
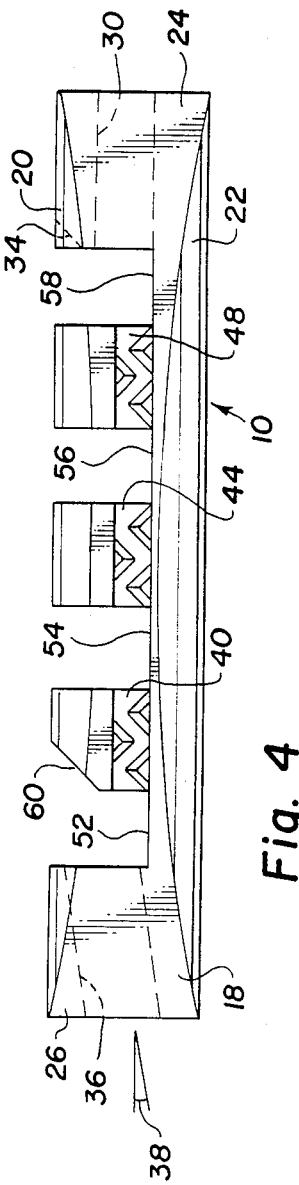

APPARATUS FOR SECURING A FISHING LURE TO A FISHING LINE

FIELD OF INVENTION

This apparatus relates generally to fishing equipment, and more particularly to a fishing lure attachable to a fishing line.

BACKGROUND OF THE INVENTION

A conventional fishing pole includes a tapered, flexible rod with a handle and a reel mounted on the rod adjacent the handle. A length of fishing line is partially wound on the reel and extends along the rod through a series of "eyes" mounted on the rod. A fishing lure may be connected to the end of the fishing line and is used to attract and hook fish. For the purposes of this application, a fishing lure may include any type or size of hook, or a body of any size, shape or color, with one or more hooks attached thereto. Conventional fishing lures are attached to the fishing line by inserting the fishing line through a hole, also known as an "eye", in the lure, or a loop attached to the fishing lure, and tying the line thereto. In order to disconnect the fishing lure from the fishing line, the fishing line must be cut. An additional piece of equipment called a "leader" is sometimes used and is attached to the fishing line. A leader is a relatively short (usually 6 to 18 inches in length) piece of fishing line or metal wire. The fishing line is tied to one end of the leader. The other end of the leader typically includes a resilient clip. The clip may be connected or disconnected to a number of different fishing lures by manipulation of the clip, without requiring the fishing line to be cut.

However, these conventional designs are inefficient and difficult to use under actual fishing conditions. The line strength of a conventional monofilament fishing line is severely reduced if formed into a knot, due to the stresses and deformation introduced thereby. The knot thus becomes the "weak link" in the equipment used by a fisherman and increases the possibility of a broken line when a fish is caught on the fishing lure.

During fishing, it is frequently desired to change fishing lures so as to use a different size, shape, color or design. This may be in response to a change in environmental conditions such as the weather or time of day, or the type of fish sought, or simply at the discretion of the fisherman. Further, on occasion the line is cut accidently, such as if the fishing line is broken or the fishing lure becomes snagged on an underwater obstruction, requiring the attachment of a new fishing lure and leader, if one is used. It is important to disconnect the existing lure from the fishing line and connect the new fishing lure quickly and easily, so that fishing may be resumed as soon as possible. Cutting the existing fishing lure from the fishing line and tying the line to a new fishing lure is a very time consuming process and requires a great deal of manual dexterity to manipulate the relatively small diameter fishing line. Fishing is often conducted under adverse weather conditions and a fisherman may be wearing bulky clothing and even gloves, thus making it difficult to tie a knot in the fishing line. A leader represents an additional expense to the fisherman and still requires that the leader be tied to the fishing line. Further, under the aforementioned adverse weather conditions, it is still difficult and time consuming to open or close the clip on the end of the leader.

SUMMARY OF THE INVENTION

This invention provides apparatus having an elongated body defining a longitudinal axis. One end of the body nearest the tip of the fishing rod provides a passageway for receipt of the end of the fishing line. The other end of the body, adjacent the fishing lure, also includes a passageway and slit adapted to receive the fishing line. The apparatus body includes a plurality of transverse gripping members formed in spaced aligned pairs on the body symetrically about the longitudinal axis. The fishing line is engaged with the gripping members on alternating sides of sequential pairs of gripping members, extending toward the fishing lure end and extending out through the slit at the lure end. The fishing line forms a loop to engage the "eye" of the fishing lure and then is reinserted into the slit at the lure end, then returns to the rod tip end, and back to the lure end engaging the gripping members in a similar "shoe lace" pattern. The end of the fishing line is secured through the lure end slit with approximately ¼" of line protruding out of the apparatus toward the attached lure. To disconnect the lure from the line, the line end is removed through the lure end slit, then unwound or disengaged from the gripping members in reverse order up to the rod tip end and then back to the lure, at which point the lure is removed by sliding it off the end of the line. Another lure can now be quickly attached.

Therefore, it is a principle feature and advantage of this invention to provide an improved apparatus for quickly and easily attaching a fishing lure to a fishing line.

It is another feature and advantage of this invention to provide an improved apparatus for connecting a fishing lure to a fishing line without tying a knot in the fishing line.

It is yet another feature and advantage of this invention to provide an improved apparatus for attaching a fishing lure to a fishing line, which may be disconnected from the fishing line without cutting the fishing line.

IN THE DRAWINGS

So that the manner in which the above recited features and advantages of the invention, as well as others which will become apparent to those skilled in the art, are obtained and can be understood in detail, a more particular description of the invention briefly summarized above may be had by reference to the embodiments thereof which are illustrated in the drawings, which drawings form a part of the specification and in which like numbers refer to like parts in the several views. It is noted however, that the appended drawings illustrate only a preferred embodiment of the invention and are therefor not to be considered limiting of their scope, for the invention may admit to other equally effective embodiments.

FIG. 1 is a top view of the apparatus of this invention.

FIG. 2 is one end view of the apparatus of FIG. 1.

FIG. 3 is another end view of the apparatus of FIG. 1.

FIG. 4 is a side view of the apparatus of FIG. 1.

DETAILED DESCRIPTION OF THE INVENTION

Figure 5:
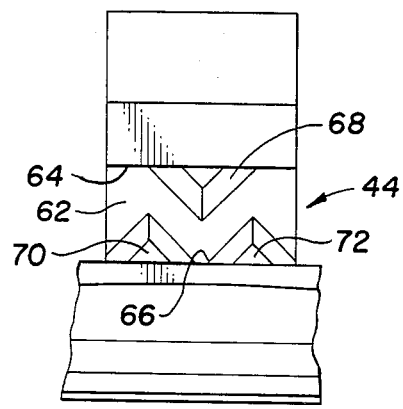
FIG. 5 is a detailed view of a gripping member in FIG. 4.

Referring now to FIGS. 1 through 4, the reference numeral 10 generally indicates the apparatus of this invention, which includes elongated body 12 defining longitudinal axis 14. Body 12 may be constructed of any suitable material, but preferably forms a monolithic molded plastic piece. Various materials may be employed to form the body. However, it has been found advantageous to construct the body from a material with a density approximatly equal to that of the water (i.e. fresh water or salt water) in which the apparatus is to be used. Specifically, a material having a specific gravity of between 0.95 and 1.05 has been found to be advantageious. Polyamides, such as nylon, or polystyrene, polypropylene, and polyethylene are materials which are available in the above range of densities for use in forming the apparatus of this invention. The body will thus have a neutral bouyancy and will not affect the movement or position of the fishing lure while being pulled through the water. Of course, a material could be selected which has a density greater or lesser than the above specified range, if desired. In addition, the color of the body may be selected to attract fish, to match the color of the fishing lure, or the body may be made transparent, as desired.

Body 12 includes convex sides 16 and 18, respectively, and convex top and bottom surfaces 20 and 22, respectively, all of which form a streamlined cross-sectional profile to reduce resistance as the apparatus is pulled through the water. Body 12 terminates at one end 24 adjacent the lure and at another end 26 directed towards the tip of the fishing rod, with each end forming parallel surfaces transverse to the longitudinal axis of the body. Alternate configurations or body shapes may be employed, if desired.

Lure end 24 includes passageway 30 generally aligned with the longitudinal axis of the body. In the illustrated embodiment, passageway 30 includes slit 32 extending to upper surface 20, having a width greater than the diameter of the line connected to the fishing lure, but less than the passageway. Beveled surfaces 34 are formed in the body about slit 32 and facilitate the insertion or removal of the fishing line from the slit. Rod tip end 26 includes passageway 36 extending inwardly. Passageway 36 is inclined towards upper surface 20 at angle 38 whose purpose will be explained hereinafter. Preferably, angle 38 is between five to ten degrees, and most specifically, at an angle of 7.5 degrees.

Six gripping members 40, 42 44, 46, 48, and 50, respectively, are formed on the body transversely with respect to the longitudinal axis. Preferably, the ends of the various gripping members conform to the curvature of sides 16 and 18. Gripping members 40 and 42; 44 and 46; and 48 and 50, respectively, form three aligned pairs symmetrical about the longitudinal axis of the body. Each pair of gripping members is spaced from adjacent pairs and from rod tip end 26 and lure end 24, by spaces 52, 54, 56 and 58 as shown in the drawings. The structure of the body is such that the upper part of the body, which includes the spaces, creates more resistance when pulled through the water, than the lower part of the body. Thus, the body is inherently stable and automatically assumes a righted position when immersed in water. This stability is important in supporting the operation of a fishing lure. Beveled surface 60 is formed on gripping members 40 and 42 opposite the end of the passageway 36 in the rod tip end, and as illustrated is inclined at a 45 degree angle from the longitudinal axis.

Figure 6:
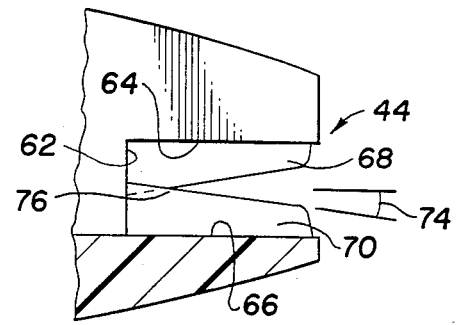
FIG. 6 is a side view of the gripping member along plane 6—6 of FIG. 4.

FIGS. 5 and 6 illustrate in detail gripping member 44, which includes slot 62 having upper surface 64 and opposing lower surface 66. Upper tooth 68 is formed in upper surface 64 and extends transversely from longitudinal axis 14. Lower teeth 70 and 72 are formed on lower surface 66 extending parallel to the upper tooth 68 and straddle but are spaced apart from the upper tooth by a distance less than the thickness of the fishing line with which the apparatus is designed to be used. Both the upper and lower teeth are triangular in cross section, with the apex directed towards the opposite surface of the slot. Other cross-sectional shapes for the teeth may be employed as may be found useful.

As shown particularly in FIG. 6, the upper and lower teeth are tapered and diverge as they extend outwardly from the longitudinal axis. The teeth are tapered at a relatively shallow angle 74, preferably 10 degrees. Moreover, the teeth are so constructed that although spaced apart, when viewed in profile the upper tooth and the lower teeth extend more than halfway across the height of the slot and thus overlap. However, as the upper and lower teeth diverge they crossover at point 76. The tapered profile of the teeth of gripping member 44 enables the gripping member to accept and grip a wide range of fishing line diameters inserted within the slot and frictionally engaged by the upper and lower teeth. The effectiveness of the gripping member will increase as the fishing line is inserted further within the slot towards the longitudinal axis.

Figure 6A:
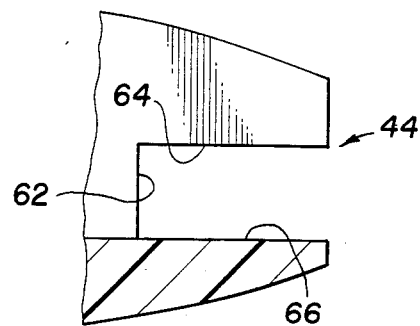
FIG. 6a is a side view of an alternate embodiment of the gripping member of FIG. 4.
Figure 6B:
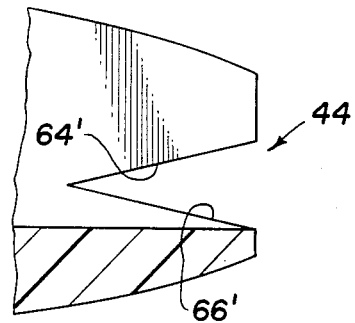
FIG. 6b is a side view of yet another alternate embodiment of the gripping member of FIG. 4.
Figure 7C:
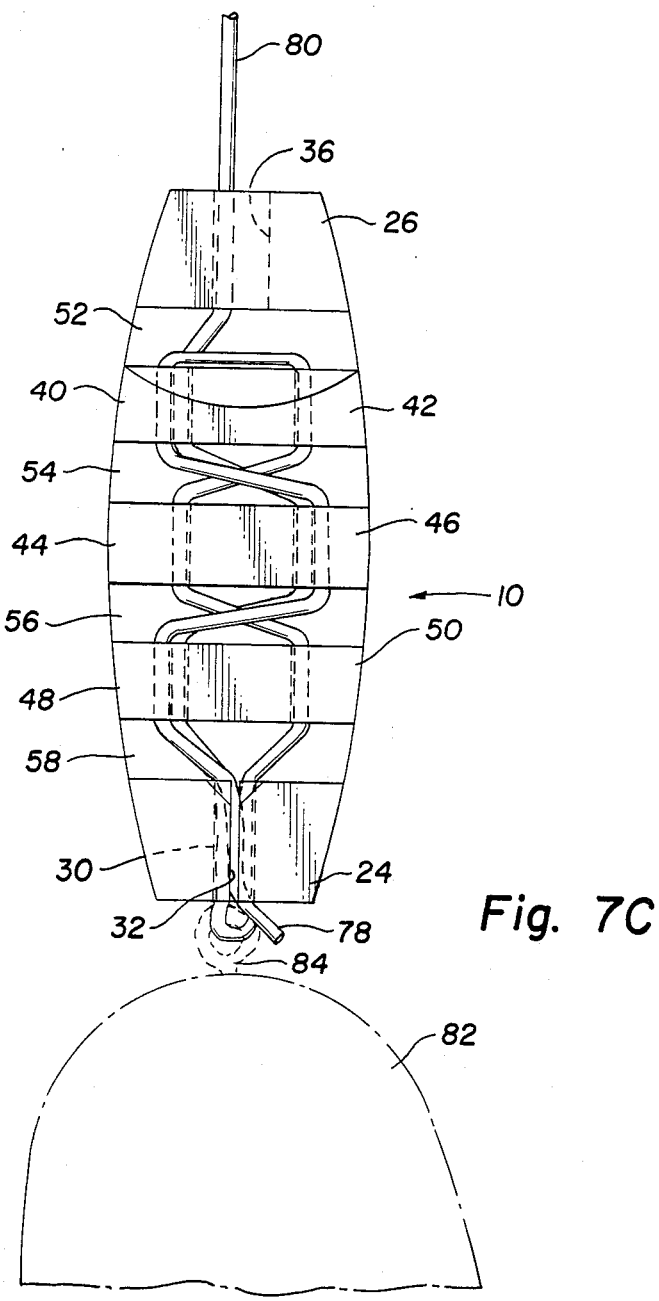
FIG. 7C is a top view of the apparatus of FIG. 7B fully connected to the fishing line.

The gripping members of this invention may employ other structures to grip a fishing line. For instance, as is shown in FIG. 6a the upper and lower teeth may be omitted, and the opposing, parallel surfaces 64 and 66 formed with a roughened or knurled finish in order to grip a suitably sized fishing line inserted into the slot. In another alternate structure shown in FIG. 6b, the upper and lower teeth may be omitted and surfaces 64' and 66' are inclined and diverge outwardly, provided with a roughened or knurled finish for frictionally engaging a variety of fishing line diameters.

Figure 7A:
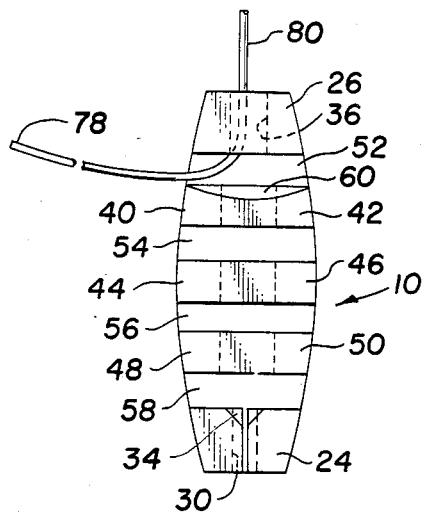
FIG. 7A is a top view of the apparatus of this invention with a fishing line inserted into the rod tip-end passageway.

In operation, end 78 of fishing line 80 is inserted through upwardly inclined passageway 36 and extends across space 52 at an angle and encounters surface 60 and is directed upwardly thereby, as shown in FIG. 7A, where it may be grasped easily. A sufficient length of the fishing line, preferably at least three times the length of the elongated body, is then pulled through passageway 36 and then downwardly towards side 18. The fishing line is pulled into engagement with gripping member 40. Referring again to FIGS. 5 and 6, the fishing line is engaged with the gripping member by being pulled into slot 62 between and frictionally engaged with the upper and lower teeth within the slot.

Figure 7B:
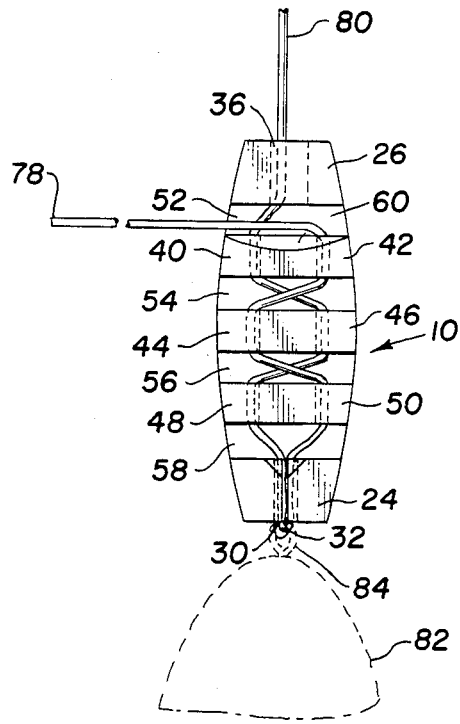
FIG. 7B is a top view of the apparatus of FIG. 7A partially connecting a fishing lure to the fishing line.

After engagement with gripping member 40 and as shown in FIG. 7B, the fishing line is brought diagonally across space 54 and similarly engaged with gripping member 46 on side 16. The fishing line is then brought diagonally across space 56 back to side 18 and is engaged with gripping member 48. To complete the connection, the fishing line exits gripping member 48 in space 58, travels through slit 32 into passageway 30 and exits the apparatus through passageway 30 at end surface 24. Line end 78 the passes through "eye" attachment 84 of lure 82, then line 80 passes back through slit 32 down into passageway 30, pulling snug the lures eye attachment up against end 24. The fishing line exits from passageway 30 into space 58, travels to and through gripping member 50, and then back diagonally across space 56 to gripping member 44, then back diagonally across space 54 to and through gripping member 42, then circles behind gripping member 42 in space 52 to and through gripping member 40, then back diagonally through space 54 to and through gripping member 46, then back diagonally through space 56 to and through gripping member 48, then back diagonally through space 58 to and through slit 32 into passageway 30. Fishing line 80 exits passageway 30 with end 78 protruding approximately ¼ inch past lure end 24 and facing the attached lure. Disconnection of the fishing line is easily accomplished by extracting fishing line end 78 of line 80 from passageway 30 through slit 32 then "unlacing" the line by sequentially pulling it out from engagement with each of the gripping members in reverse order. If it is desired to change fishing lures only, rather than completely remove the apparatus from the fishing line, the fishing line may be partially disengaged from the gripping members to allow the fishing lure to slide off of the fishing line without detaching the apparatus of the invention. Another fishing lure is placed on the fishing line which is then fully re-engaged with the gripping members, as previously described.

The apparatus of this invention thus securely connects the fishing lure to the fishing line. The connection or disconnection of the fishing line is quickly accomplished without requiring a knot to be tied or the fishing line to be cut. Further, the absence of a knot in the fishing line insures that its full line strength will be employed during fishing.

Although not illustrated, it is within the spirit of the scope of this invention to incorporate the apparatus as an integral part of the body of a fishing lure and thus eliminate passageway 30, slit 32 and surfaces 34 on the lure end of the apparatus. Of course, other patterns for engaging the fishing line with the gripping members may be devised as may be found advantageous. Further, the number and spacing of the pairs of gripping members may be adjusted as desired.

What is claimed is:

1. Apparatus for securing a fishing lure to a fishing line, comprising:
an elongated body defining a longitudinal axis and having a first and a second end, said body including at least two pairs of aligned transverse gripping members mounted on said body symmetrical about said longitudinal axis and said gripping members are spaced apart from said first and said second ends of said body and from each other, said gripping members adapted for frictionally engaging the fishing line and engaging the fishing lure so as to secure the fishing lure thereto, each of said pair of gripping members are longitudinally spaced apart by a fishing line accommodating space, said fishing line accommondating space being adapted to accommondate a fishing line therein, and said gripping members each comprise:

(a) a slot formed in said body, said slot having an opening, and said slot opening transvere to said longitudinal axis;
(b) an upper tooth formed in said slot transverse to said longitudinal axis; and
(c) a pair of lower teeth formed in said slot generally parallel to but offset and spaced apart from said upper tooth, whereby the fishing line is gripped between said upper tooth and said lower teeth when inserted within said slot.

2. The apparatus of claim 1, wherein said upper and lower teeth diverge outwardly within said slot.

3. The Apparatus of claim 2, wherein said upper and lower teeth diverge at a constant angle of 10 degrees.

4. The apparatus of of claim 1, wherein said gripping members each comprise:
a slot formed in said body transverse to said longitudinal axis, said slot having opposing parallel surfaces adapted to frictionally engage the fishing line when inserted within said slot.

5. The apparatus of claim 1, wherein said gripping members each comprise:
a slot formed in said body transverse to said longitudinal axis, said slot having an upper and a lower surface, said upper and lower surfaces diverging outwardly from said longitudinal axis of said body and adapted to frictionally engage the fishing line when inserted within the slot.

6. The apparatus of claim 1, wherein said pasageway on said second end includes a slit adapted for recieving the fishing line as the fishing line is inserted into said passageway in said second end.

7. The apparatus of claim 1, wherein each of said first and second ends of said body have a passageway for receiving the fishing line.

8. Apparatus for securing a fishing lure to a fishing line, comprising:
(a) a body defining a longitudinal axis;
(b) two generally parallel rows of gripping members, said rows spaced apart by a fishing line accommondating space, said fishing line accommondating space being adapted to accommondate a fishing line therein, and said rows extend from said body, said gripping members in each row being traversely aligned pairs about said longitudinal axis of said body, each of said gripping members including a slot wherein a line passing axis of the slot is defined by the direction the slot is adapted to pass a line and said line passing axis is generally parallel to the longitudinal axis of the body, whereby the fishing line maybe engaged with said gripping members and the fishing lure so as to secure the fishing lure to the fishing line.

9. The apparatus of claim 8, wherein each of said gripping members comprise:
(a) a slot formed in said body;
(b) an upper tooth formed in said slot transverse to said longitudinal axis; and
(c) a pair of lower teeth formed on an opposite side of said slot spaced apart from said first tooth, said upper and said lower teeth adapted to frictionally engage the fishing line when inserted within the slot.

10. Apparatus of claim 8, wherein said body includes a first and a second end, at least one of said first and said second ends having a passageway adapted for receiving the fishing line and extending to said gripping members for conveying the fishing line to the gripping members.

* * * * *